US008850426B2

(12) United States Patent
Glikson et al.

(10) Patent No.: US 8,850,426 B2
(45) Date of Patent: Sep. 30, 2014

(54) MANAGING REMOTE DEPLOYMENT OF A VIRTUAL MACHINE AND SERVICE REQUEST TO BE PROCESSED BY THE VIRTUAL MACHINES BASED ON NETWORK BANDWITH AND STORAGE CONNECTIVITY

(75) Inventors: Alexander Glikson, Haifa (IL); Benny Rochwerger, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/636,742

(22) Filed: Dec. 13, 2009

(65) Prior Publication Data

US 2011/0145816 A1    Jun. 16, 2011

(51) Int. Cl.
*G06F 9/455* (2006.01)
*G06F 9/445* (2006.01)

(52) U.S. Cl.
CPC .... *G06F 9/45558* (2013.01); *G06F 2009/4557* (2013.01); *G06F 2009/45562* (2013.01)
USPC ............... 718/1; 709/220; 709/227; 709/233; 717/172; 717/174; 717/176

(58) Field of Classification Search
CPC . G06F 9/4558; G06F 9/45533; G06F 9/5077; G06F 9/5088; G06F 9/445; G06F 9/44505; G06F 2009/45562; G06F 2009/4557; G06F 8/60; G06F 8/63; G06F 8/68; G06F 8/76; H04L 29/08981
USPC ......... 718/1; 707/999.201, 999.104; 709/203, 709/224, 227, 220, 233; 717/171–176
See application file for complete search history.

(56) References Cited

U.S. PATENT DOCUMENTS

| 6,874,020 | B1 * | 3/2005 | Da Palma et al. | 709/223 |
| 7,849,462 | B2 * | 12/2010 | Traut et al. | 718/1 |
| 7,904,540 | B2 * | 3/2011 | Hadad et al. | 709/223 |
| 8,005,991 | B2 * | 8/2011 | Lo et al. | 709/248 |
| 8,010,679 | B2 * | 8/2011 | Low et al. | 709/227 |
| 8,255,484 | B2 * | 8/2012 | Khandekar et al. | 709/217 |
| 8,296,419 | B1 * | 10/2012 | Khanna et al. | 709/224 |
| 8,667,500 | B1 * | 3/2014 | Ji et al. | 718/105 |
| 2004/0187133 | A1 * | 9/2004 | Weisshaar et al. | 718/100 |

(Continued)

OTHER PUBLICATIONS

Wu et al., VMGrid: A Virtual machine Supported Grid Middleware, 2008, IEEE, 676-679.*
"Research and development of reliable low-power server", New Energy and Industrial Technology Development Organization. May 2006.

(Continued)

*Primary Examiner* — Abdullah Al Kawsar
*Assistant Examiner* — Abu Ghaffari (57) ABSTRACT

A method for managing remote deployment of a virtual machine (VM) in a network environment is provided. A VM image stored in a second storage medium is copied to a first storage medium. The first storage medium is located in close proximity to a first computing system, and the second storage medium is located remotely from the first computing system and in close proximity to a second computing system. As the VM image is being copied, a first VM is deployed on the first computing system from a partial copy of the VM image stored in the first storage medium, and a second VM is deployed on the second computing system from the VM image stored in the second storage medium. Service requests submitted to the first computing system are managed either locally by the first VM or remotely by the second VM based on type of service requested.

21 Claims, 5 Drawing Sheets

(56) References Cited

U.S. PATENT DOCUMENTS

| | | | |
|---|---|---|---|
| 2007/0300220 A1* | 12/2007 | Seliger et al. | 718/1 |
| 2009/0210527 A1* | 8/2009 | Kawato | 709/224 |
| 2009/0288084 A1* | 11/2009 | Astete et al. | 718/1 |
| 2010/0088699 A1* | 4/2010 | Sasaki | 718/1 |
| 2010/0169948 A1* | 7/2010 | Budko et al. | 726/1 |
| 2010/0262964 A1* | 10/2010 | Uyeda et al. | 718/1 |

OTHER PUBLICATIONS

David O'Hallaron, "Dimorphic Computing", University of Toronto, Carnegie Mellon University Apr. 2006, CMU-CS-06-123.

David O'Hallaron, "Transparent Automatic Migration of Interactive Resource-Intensive Applications", Jan. 2007 CMU-CS-07-101.

Sanjay Kumar, "Netbus: A Transparent Mechanism for Remote Device Access in Virtualized Systems".

* cited by examiner

MANAGING REMOTE DEPLOYMENT OF A VIRTUAL MACHINE AND SERVICE REQUEST TO BE PROCESSED BY THE VIRTUAL MACHINES BASED ON NETWORK BANDWITH AND STORAGE CONNECTIVITY

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to virtual machines and, more particularly, to managing remote deployment of a virtual machine in a network environment.

BACKGROUND

In a virtualization environment, a host software (e.g., a hypervisor) running on one or more software or hardware infrastructures (i.e., a host machine) may emulate, or virtualize, the host machine for a guest software. In other words, a hypervisor implements a virtual machine (VM) to provide services to the guest software. The hypervisor deploys the VM on the host machine by loading data utilized to implement the VM (i.e., a VM image) from a repository into memory of the host machine.

If the VM image is stored in a remote repository, the hypervisor copies the VM image from the remote repository to a local repository and deploys the VM using the VM image in the local repository. Deployment of the VM is delayed until the VM image is completely copied to the local repository. In another implementation, the VM is deployed on a remote server over a network, which raises latency issues, requires the host machine to be constantly connected to the remote server, and requires the remote server to manage support and updates for the VM.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for managing remote deployment of a virtual machine (VM) in a network environment is provided. A VM image stored in a second storage medium is copied to a first storage medium. The first storage medium is located in close proximity to a first computing system, and the second storage medium is located remotely from the first computing system and in close proximity to a second computing system. As the VM image is being copied, a first VM is deployed on the first computing system from a partial copy of the VM image stored in the first storage medium, and a second VM is deployed on the second computing system from the VM image stored in the second storage medium. Service requests submitted to the first computing system are managed either locally by the first VM or remotely by the second VM based on type of service requested.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
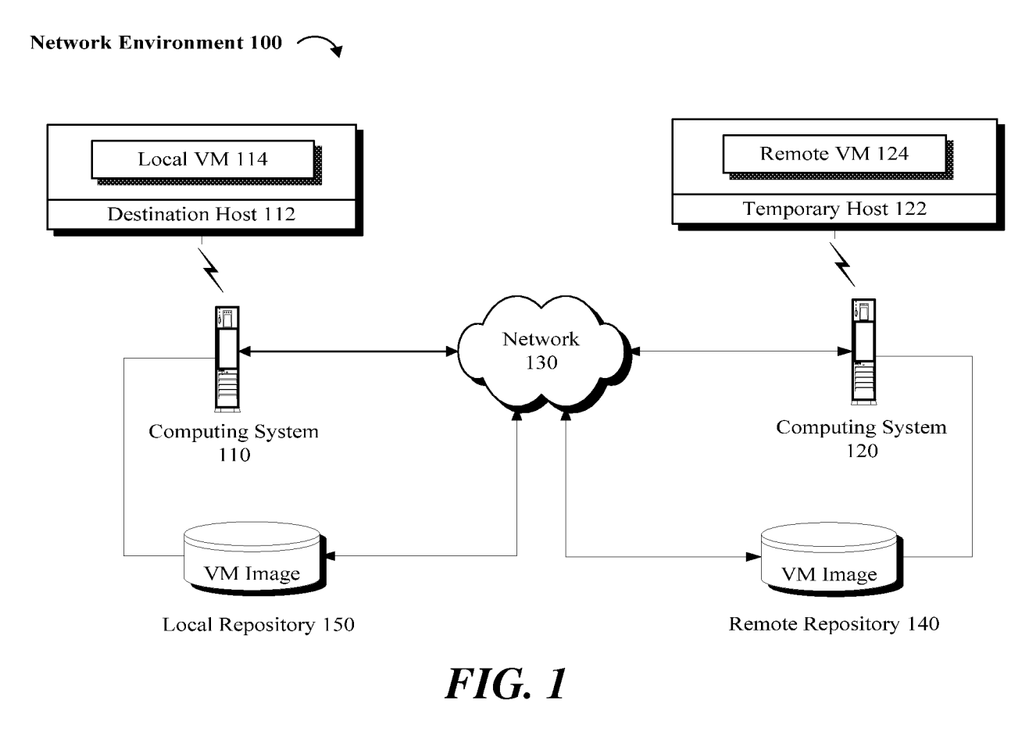
FIG. 1 illustrates an exemplary network environment, in accordance with one or more embodiments.

Referring to FIG. 1, in accordance with one or more embodiments, an exemplary network environment 100 comprises a computing system 110, a computing system 120, a network 130, and a remote repository 140. The computing system 110 is remotely connected to the computing system 120 by way of the network 130. The computing system 120 is a computing system that is local or in close proximity to the remote repository 140. A software application executing on the computing system 110 may generate a request that is to be serviced by a VM. If an image of the VM is stored in the remote depository 140, it would be desirable to copy the VM image to a storage medium (e.g., local repository 150) situated within close proximity to the computing system 110 and deploy a local VM 114 to service the request.

Figure 2:
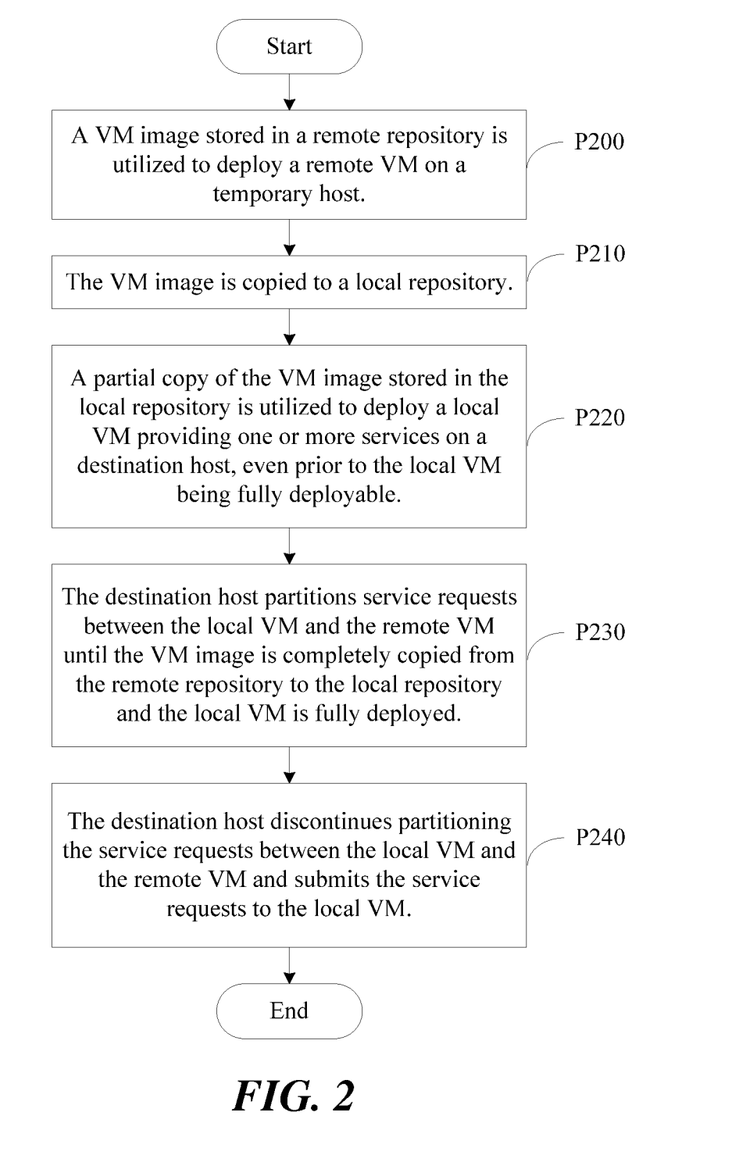
FIGS. 2 and 3 are flow diagrams of a method for managing deployment of a VM using a VM image stored in a remote repository, in accordance with one embodiment.

Copying the VM image from the remote repository 140 to the local repository 150 and deploying a local VM 114 on a destination host 112 running on computing system 110 may take a long time, depending on the available network bandwidth and the distance between the remote repository 140 and the computing system 110. Referring to FIGS. 1 and 2, to minimize the latency associated with copying and deploying the VM image from the remote repository 140, in accordance with one embodiment, the VM image is utilized to deploy a remote VM 124 on a temporary host 122 running on the computing system 120 (P200). The deploying of the VM on the temporary host 122 is substantially faster than deploying the VM on destination host 112 due to the close proximity of the remote repository 140 to the computing system 120.

Depending on implementation, either before, during, or after the deploying of the VM image on the temporary host 122, the VM image may be copied to the local repository 150 (P210). While the VM image is being copied from the remote repository 140 to the local repository 150, a partial copy of the VM image stored in the local repository 150 may be utilized to deploy a local VM 114 with one or more functionalities or services on the destination host 112, even prior to the local VM 114 being fully deployable (P220). Accordingly, the local VM 114 may locally service one or more requests submitted to the destination host 112.

Depending on the level of functionality or services that are available at the local level, service requests submitted to the destination host 112 may be partitioned between the local VM 114 and the remote VM 124. The partitioning, in certain embodiments, may continue until the VM image is completely copied from the remote repository 140 to the local repository 150 and the local VM 114 is fully deployed (P230). Desirably, upon complete deployment of the local VM 114, the destination host 112 discontinues partitioning service requests between the local VM 114 and the remote VM 124 and submits the service requests to the local VM 114 (P240). Depending on implementation and for optimal performance, in some embodiments, the destination host 112 may continue to partition service requests between the local VM 114 and the remote VM 124, even after the local VM 114 has been fully deployed.

In other words, after the image is fully transferred to the local repository 150, the state of the remote VM 124 is transferred and merged into the local VM 114, and the remote VM 124 is destroyed, while the local VM 114 takes over all the functionality and continues running as if it were deployed from the local repository 150 in a regular way. The state transfer is performed using techniques normally used in live migration of a VM.

The processes provided above may be utilized to transparently migrate a VM from a source environment to a destination environment, as provided in more detail below. Within the context of the exemplary embodiment disclosed here, the source environment refers to an environment comprising the remote repository 140 and one or more potential temporary hosts. The destination environment refers to an environment comprising the local repository 150 and the destination host 112, from which service requests are submitted.

Figure 3:
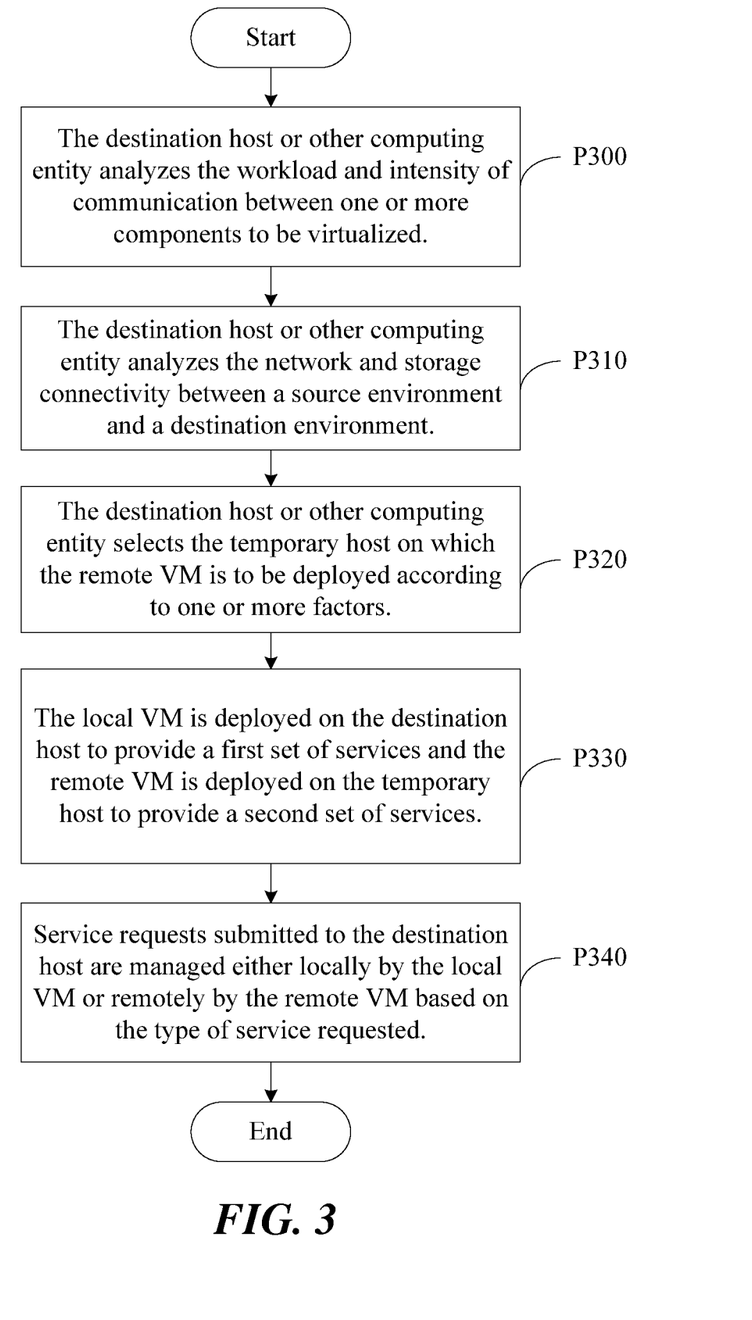

Referring to FIGS. 1 and 3, in accordance with one embodiment, the destination host 112 or other computing entity may analyze the workload and intensity of communication between one or more components (e.g., central processing unit (CPU), memory, disk, user interface, network, or other components) virtualized by a VM (P300). The network and storage connectivity (e.g., topology, bandwidth, latency, or other heuristics) between a source environment and a destination environment of the VM may be also analyzed (P310).

The results of the above-noted analysis may be utilized to determine the number and type of functionalities or services that can be provided by the source and destination environments, respectively, while a copy of the VM image is being downloaded to the destination environment. Further, the temporary host 122 may be selected according to one or more factors such as the topology of the network 130 with respect to the computing systems 110 and 120, the proximity of the remote repository 140 to computing system 120, etc. (P320).

Depending on network and bandwidth related factors, the local VM 114 may be deployed on the destination host 112 to provide a first set of functionalities or services and the remote VM 124 may be deployed on the temporary host 122 to provide a second set of functionalities or services (P330). For example, the remote VM 124 may be deployed to virtualize CPU, memory, and disk components, and the local VM 114 may be utilized to virtualize user interface (e.g., keyboard, video, mouse, etc.) and network components.

As noted earlier, the level and the number of functionalities or services supported by the local VM 114 and the remote VM 124 and the manner in which such services and functions are partitioned between the two VMs may be based on the manner in which the VM image is deployed by the destination host 112 and temporary host 122, respectively. Accordingly, service requests submitted to the destination host 112 may be managed either locally by the local VM 114 or remotely by the remote VM 124 based on the type of service requested (P340).

It is noteworthy that the destination host 112 may execute a virtual network agent to act as a proxy for the local VM 114 with respect to communications targeted for the local VM 114 and the remote VM 124. In other words, the destination host 112 may comprise a network adapter that communicates with a central processing unit (CPU) and memory by way of a peripheral component interconnect (PCI) bus and with the network 130 by way of a network bridge or switch located external to the destination host 112, for example. Such components may be replaced by a virtual network agent, which forwards traffic to the temporary host 122, instead of passing the traffic down a network stack (e.g., PCI to network card, network card to bridge or switch, bridge or switch to the network 130).

Optimally, it may be desirable to have all requests submitted to the destination host 112 to be serviced by the local VM 114. In such a scenario, the VM image may be copied from the remote repository 140 to the local repository 150 using mirroring technology such that storage mirror switchover is synchronized with VM migration handoff. Mirroring refers to replicating (i.e., copying) data to a backup location while an application is running and resuming the application using the data at the backup location during a recovery process. In one implementation, data consistency may be preserved by configuring the backup copy to be read-only and then changing the permissions to allow reads and writes during the recovery process. Such mirroring may also be applied to VM live migration, where a VM is migrated from the temporary host 122 to the destination host 112.

To summarize, deploying a VM on a temporary host 122 (i.e., a host that is local or in close proximity to an image of the VM) desirably allows for fast deployment of the VM obviating the need to wait for the VM to be copied and deployed to a remotely located destination host. If the temporary host supports instant deployment, the deployment may be immediate. Migrating the VM from a source environment (e.g., the computing system 120 to a destination environment (e.g., the computing system 110) desirably supports fast processing of service requests submitted by the destination host 112, in addition to fast deployment of the VM.

In different embodiments, the disclosed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4:
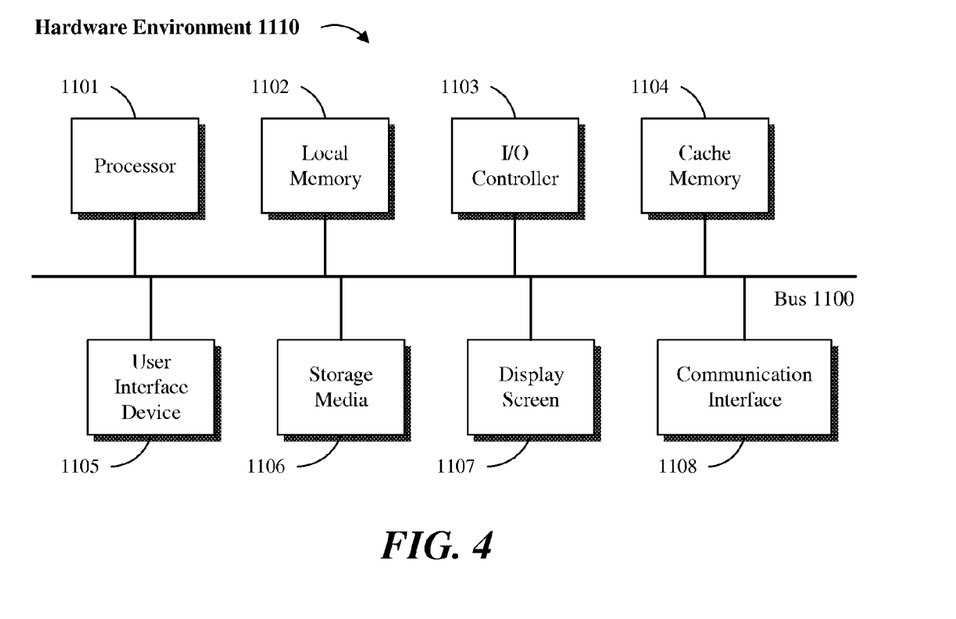
FIGS. 4 and 5 are block diagrams of hardware and software environments in which the disclosed systems and methods may operate, in accordance with one or more embodiments.
Figure 5:
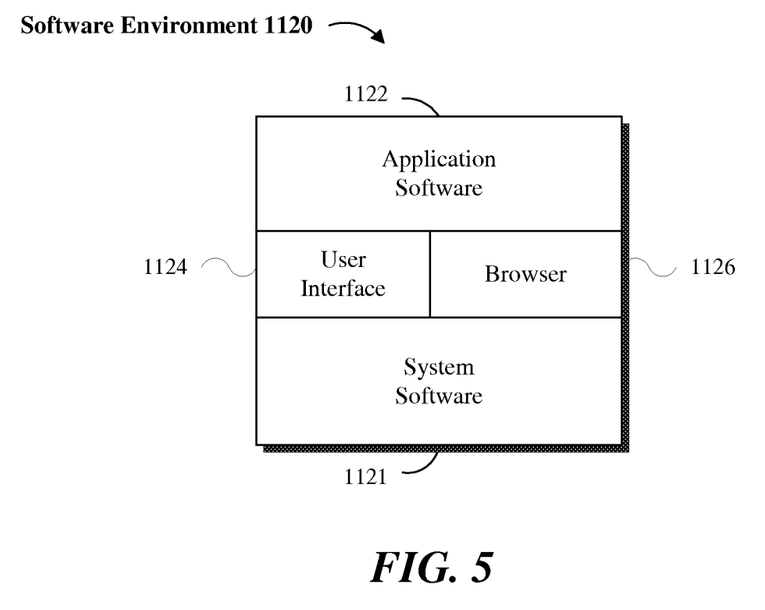

Referring to FIGS. 4 and 5, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5, software environment 1120 may be generally divided into two classes comprising system software 1121 and application software 1122 as executed on one or more hardware environments 1110. In one embodiment, the methods and processes disclosed herein may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data.

It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided herein, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for managing deployment of a virtual machine (VM) in a network environment, the method comprising:
receiving a deployment request for deploying a VM at a first computing system, the VM represented by a VM image stored in a second storage medium, remote from the first computing system;
analyzing network and storage connectivity between the first computing system and a plurality of potential temporary hosts for deploying the VM;
selecting a second computing system for deploying a second copy of the VM image from the potential temporary hosts, according to the analyzing of the network and storage connectivity between the first computing system and the potential temporary hosts;
analyzing bandwidth of communication between the first computing system and the second computing system and accordingly selecting a first set of services to be provided by a first copy of the VM image; initiating copying of the VM image stored in the second storage medium to a first storage medium local to the first computing system, responsive to the deployment request;
during the copying of the VM image, deploying a first VM image copy including a partial working VM image, suitable to provide the first set of services, on the first computing system;
deploying the second VM image copy, including a copy of at least a sub-portion of the VM image, on the second computing system, before or during the copying, so as to provide a second set of services,
monitoring service requests submitted for processing by the VM, to determine whether the service requests relate to the first or to the second set of services; and
processing service requests that are associated with the first set of services by the first computing system and forwarding service requests that are associated with the second set of services from the first computing system to the second computing system for processing by the second computing system.

2. The method of claim 1, wherein after the VM image is completely copied to the first storage medium, fully deploying the copied VM on the first computing system and managing all service requests by the first computing system.

3. The method of claim 1, wherein after the VM image is completely copied to the first storage medium, fully deploying the copied VM on the first computing system and continuing to manage some service requests on the first computing system and to forward some service requests to the second computing system, after fully deploying the copied VM on the first computing system, in order to optimize performance of the VM.

4. The method of claim 1, wherein the second computing system is selected according to proximity of the second computing system to the second storage medium.

5. The method of claim 1, wherein the second set of services comprises processing unit (CPU) services, memory services, and disk components services.

6. The method of claim 5, wherein the first set of services comprises user interface and network components services.

7. The method of claim 1, further comprising executing a virtual network agent on the first computing system to represent the second copy of the VM image deployed on the second computing system.

8. The method of claim 7, wherein the virtual network agent forwards service requests to the second computing system by way of a peripheral component interconnect (PCI).

9. The method of claim 7, wherein the virtual network agent forwards service requests to the second computing system by way of Ethernet.

10. The method of claim 7, wherein the virtual network agent is terminated, in response to the first VM being fully deployed on the first computing system.

11. The method of claim 1, wherein the VM image is copied to the first storage medium using mirroring technology.

12. A system for managing deployment of a virtual machine (VM) in a network environment, the system comprising:
a first storage medium for storing copies of virtual machine images;
a first computing system for executing virtual machine images stored in the first storage medium;
a processor for initiating copying of a VM image stored in a second storage medium to the first storage medium, responsive to a deployment request for deploying a first VM on the first computing system, and configured to analyze network and storage connectivity between the first computing system and a plurality of potential temporary hosts, to select a second computing system for deploying a second copy of the VM image from the potential temporary hosts, according to the analyzing of the network and storage connectivity between the first computing system and the potential temporary hosts and to analyze bandwidth of communication between the first computing system and the second computing system and accordingly select services to be included in a first set of services; wherein the first computing system is adapted to deploy a first VM image copy including a partial working VM image, suitable to provide the first set of services, responsive to the deployment request; and
wherein the processor is configured to monitor service requests submitted for processing to the first VM, wherein service requests that are associated with the first set of services are processed by the first computing system and other service requests are forwarded to a second computing system.

13. The system of claim 12, wherein the first computing system is adapted to deploy a complete copy of the VM image after the VM image is completely copied to the first storage medium, and wherein the processor is configured to stop monitoring the service requests after the first computing system deploys the complete copy of the VM image.

14. The system of claim 12, wherein the processor is configured to continue monitoring the service requests even after the VM image is completely copied to the first storage medium.

15. The system of claim 12, wherein the second computing system is selected according to one or more factors associated with the virtualized components or network and storage connectivity between the first computing system and the second computing system.

16. The system of claim 12, wherein the first computing system is adapted to execute a virtual network agent to represent a second VM running on the second computing system.

17. A computer program product comprising a non-transitory data storage medium having a computer readable program, wherein the computer readable program when executed on a computer causes the computer to:
initiate copying of a VM image stored in a second remote storage medium to a first storage medium local to a first computing system, responsive to a request for deploying a first VM on the first computing system, analyze network and storage connectivity between the first computing system and a plurality of potential temporary hosts for deploying the VM;

select a second computing system for deploying the second copy of the VM image from the potential temporary hosts, according to the analyzing of the network and storage connectivity between the first computing system and the potential temporary hosts;

analyze bandwidth of communication between the first computing system and the second computing system and accordingly select services to be included in a first set of services;

deploy a first VM image copy including a partial working VM image, suitable to provide the first set of services, during the copying, on the first computing system;

monitor service requests submitted for processing to the first VM to determine whether the service requests relate to the first set of services; and direct service requests that are associated with the first set of services to the deployed first, partial, copy of the VM image on the first computing system and forward service requests that are associated with the second set of services to a second VM.

18. The computer program product of claim 17, wherein the computer readable program is configured to forward all service requests submitted to the first VM, after the VM image is completely copied to the first storage medium, to a complete copy of the VM image, deployed on the first computing system.

19. The computer program product of claim 17, wherein the computer readable program is configured to continue monitoring service requests after the VM image is completely copied to the first storage medium and the first VM is fully deployed on the first computing system.

20. The computer program product of claim 17, wherein the computer readable program when executed on a computer further causes the computer to execute a virtual network agent on the first computing system to represent the second VM.

21. The method of claim 1, wherein the second storage medium is local to the second computing system and wherein deploying the second copy of the VM image on the second computing system begins before the copying of the VM image from the second storage medium to the first storage medium begins.

* * * * *